US007092150B1

(12) United States Patent
Cox (10) Patent No.: US 7,092,150 B1
(45) Date of Patent: Aug. 15, 2006

(54) OPTICALLY COMPENSATED INFRARED ZOOM LENS HAVING A SINGLE MOVABLE LENS CARRIAGE AND NO ASPHERIC LENSES

(75) Inventor: Arthur Cox, Newport Beach, CA (US)

(73) Assignee: Computer Optics, INC, Hudson, NH (US)

( * ) Notice: Subject to any disclaimer, the term of this patent is extended or adjusted under 35 U.S.C. 154(b) by 0 days.

(21) Appl. No.: 11/004,427

(22) Filed: Dec. 4, 2004

Related U.S. Application Data (60) Provisional application No. 60/528,850, filed on Dec. 11, 2003.

(51) Int. Cl.
*G02B 13/14* (2006.01)
*G02B 15/14* (2006.01)
*G02B 23/24* (2006.01)

(52) U.S. Cl. ............... 359/356; 359/355; 359/434; 359/676

(58) Field of Classification Search ........ 359/350–361, 359/676–677, 680–686
See application file for complete search history.

(56) References Cited

U.S. PATENT DOCUMENTS

| 4,148,548 A | * | 4/1979 | Thompson | 359/354 |
| 4,632,498 A |   | 12/1986 | Neil | 359/354 |
| 4,679,891 A | * | 7/1987 | Roberts | 359/357 |
| 4,802,717 A | * | 2/1989 | Kebo | 359/354 |
| 4,952,050 A | * | 8/1990 | Aizu et al. | 351/221 |
| 5,880,879 A | * | 3/1999 | Foo | 359/356 |
| 5,933,272 A | * | 8/1999 | Hall | 359/357 |
| 6,091,551 A |   | 7/2000 | Watanabe | 359/676 |

* cited by examiner

*Primary Examiner*—Thong Q Nguyen
(74) *Attorney, Agent, or Firm*—Robert Nathans (57) ABSTRACT

An infrared zoom lens having no aspheric lens elements comprises, six distinct lens groups each having two or less spherical lens elements. The first group has a positive power, the second group has a negative power, the third group has a positive power, the fourth group has a negative power, the fifth has a positive power and the sixth group has either a positive or negative power with the purpose of relaying and focusing the output of the fourth lens group onto the focal plane of the imaging device. The second and fourth groups are axially movable but fixed relative to each other and move as a group relative to stationary groups one and three. The zoom ratio is thus varied, and no additional motion is required to keep the imagery sharp at the output focal plane as the lens is varied from the wide angle to the telephoto position.

21 Claims, 8 Drawing Sheets

OPTICALLY COMPENSATED INFRARED ZOOM LENS HAVING A SINGLE MOVABLE LENS CARRIAGE AND NO ASPHERIC LENSES

RELATED APPLICATION

This application claims the benefit of provisional application No. 60/528,850 filed in the name of Arthur Cox on Dec. 11, 2003.

BACKGROUND OF THE INVENTION

The present invention relates to the field of an infrared zoom lens suitable for infrared rays over a wavelength range of 2.5 to 5.5 microns or 8 to 14 microns.

In the marketplace as of this writing there has been an arrival of products in the marketplace that can detect radiation between the ranges of 2.5 to 5.5 microns or 8 to 14 microns and through the use of an appropriate focal plane image detector array, sense and convert this radiation to digital imagery suitable for viewing on a display or monitor. This region of radiation is of interest to human observers since it primarily is the wavelength of heat radiation. As a result, any process or organism that generates heat such as humans self-generate the resultant imagery and that is clearly visible, even with zero lux of additional incident illumination on the subject. In the parlance of the marketplace this has been called "Night Vision" and/or "Infrared Cameras".

As these technologies have matured over the past 10 years, the quality of the imagery has been improving and the price point of the devices in the marketplace has dropped approximately an order of magnitude. This has resulted in ever greater market penetration and a need for a variety of lenses to transfer the radiation from the subject into a clear crisp image onto the focal plane of the infrared cameras. Thus far the vast majority of the lenses are either two position lens systems (i.e. 50 or 200 mm focal length lenses) or fixed focal length lenses.

In the case of a mechanically compensated zoom system two moving subassemblies units are required to achieve the required optical performance which unfortunately calls for a relatively complex design. In contrast, in the case of an optically compensated system of the present invention, only the movement of one subassembly is required. The IR zoom lens device of Neil U.S. Pat. No. 4,632,498 has two independently moving parts to keep the lens device in focus. Furthermore, Neal requires at least one lens element having an aspheric surface to make his lens focus at all, which is more difficult to manufacture than a zoom system having no lens elements with aspheric surfaces as in the system of the present invention. Also he calls for the use of ZnSe without employing silicon, which is less desirable than the use of germanium and silicon.

Furthermore, Neil's design with his required aspheric surface, only allows for a good focus at four points (his table II, columns 5 and 6). In contrast, the present invention is a continuously in focus zoom lens device; that is, it's a truly optically compensated zoom lens.

Watanabe U.S. Pat. No. 6,091,551 employs the movement of positive lens groups, in contrast with the present invention employing single subassembly (carriage) movement of two lens groups together as a unit, yet providing continuous zoom motion with focus being maintained.

BRIEF SUMMARY OF THE INVENTION

The lens system consists of six distinct lens groups. The lens system uses a technique of zoom ratio variation known as "Optical Compensation". Unique to the invention is that the negative groups are ganged together (i.e. fixed relative to each other). Only negative lens groups II and IV move as a single unit. This unit moves in relation to groups I and III and V and VI that remain fixed throughout the variation in focal length of the lens. Groups V and VI serve to relay the image to the focal plane without requiring any additional focusing. No such variation is required here. Furthermore, the lens design consists of all spherical elements requiring no aspheric components while simultaneously keeping the number of lenses down to two or less per group.

The zoom lens of the invention has been manufactured and its performance measured and the image remains in focus over the entire zoom range. The zoom lens employs a doublet, employing both silicon and germanium, allowing for color achromatization in aid of maintaining focus

DESCRIPTION OF THE DRAWINGS

FIGS. 4–8 follow the same conventions with each radii and thickness numbered sequentially.

DETAILED DESCRIPTION OF PREFERRED EMBODIMENTS OF THE INVENTION

Figure 1:
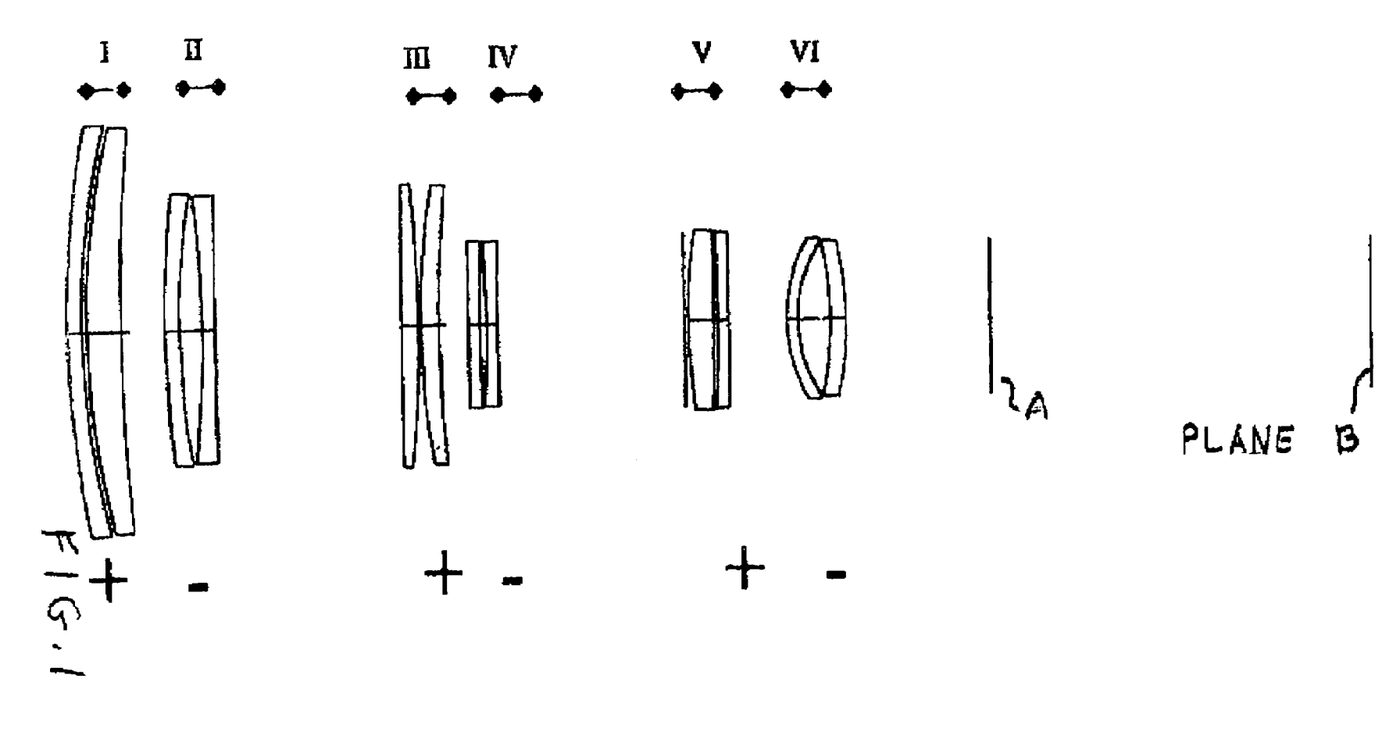
FIG. 1, shows the preferred embodiment of the infrared zoom lens. The lens consists of six distinct groups denoted Groups I through VI with each group highlighted by the appropriate Roman numeral. Below each lens group is an indication either a "+" or a "−" indicating either positive (converging) or negative (diverging) power.
Figure 2:
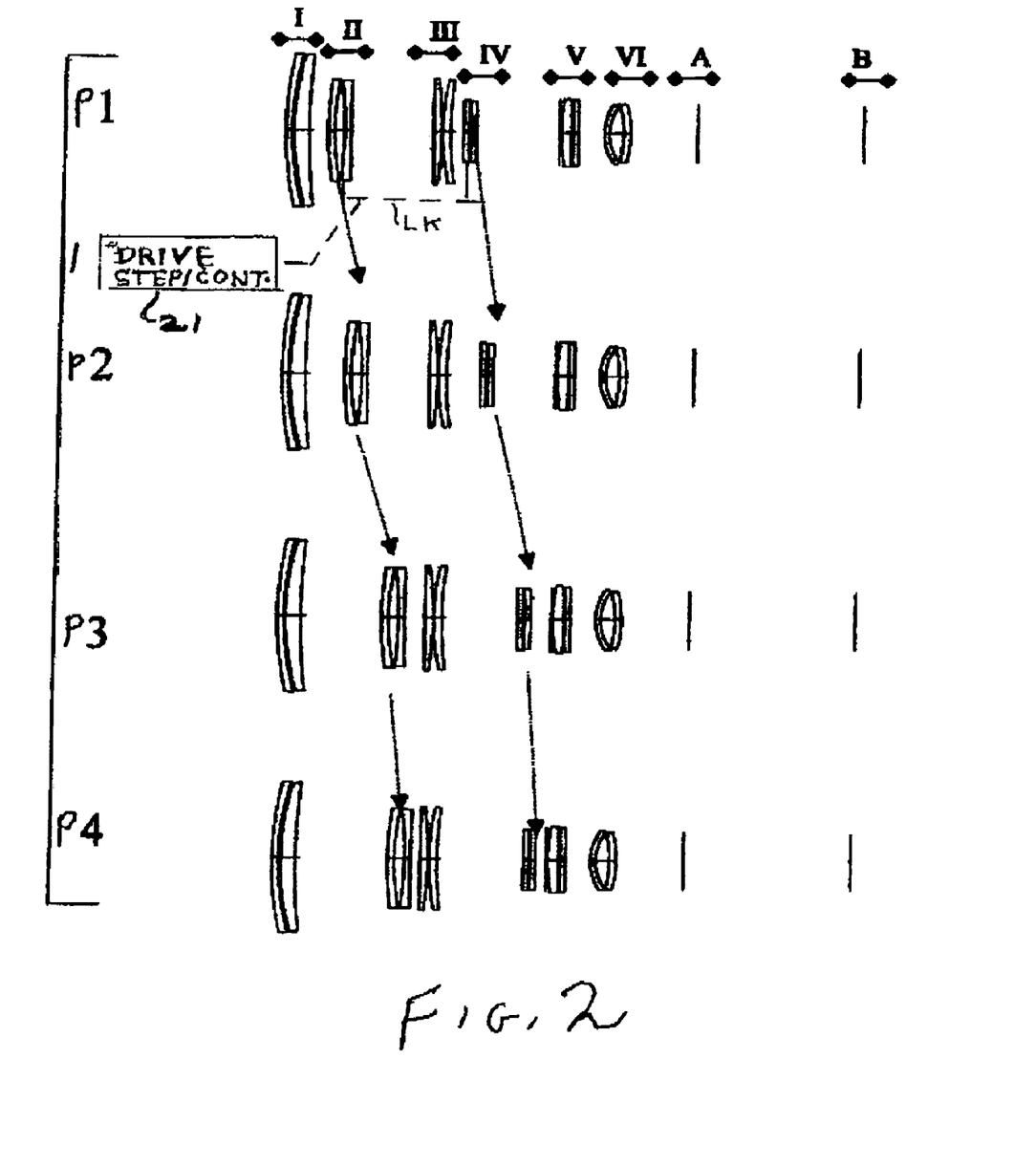
FIG. 2 shows the motion of groups II and groups IV as the zoom ratio is varied from wide angle (position P1) to telephoto (position P4).

As shown in FIGS. 1 and 2, the preferred embodiment consists of six lens groups. For clarity the image "stop" is shown as plane A and the image plane is shown at plane B. The image "stop" in this configuration is often called the "cold stop" and serves the purpose of blocking any off-axis heat that might get into the lens system. Since the focal plane detects heat, the purpose of the "cold stop" is to block any external heat energy from impinging on the focal plane and lowering the signal to noise of the desired signal.

Group I consists of two lenses as do all of the other groups in the preferred embodiment. As shown in the notation in the bottom part of FIG. 1 the groups alternate in power from positive to negative power.

Figure 3:
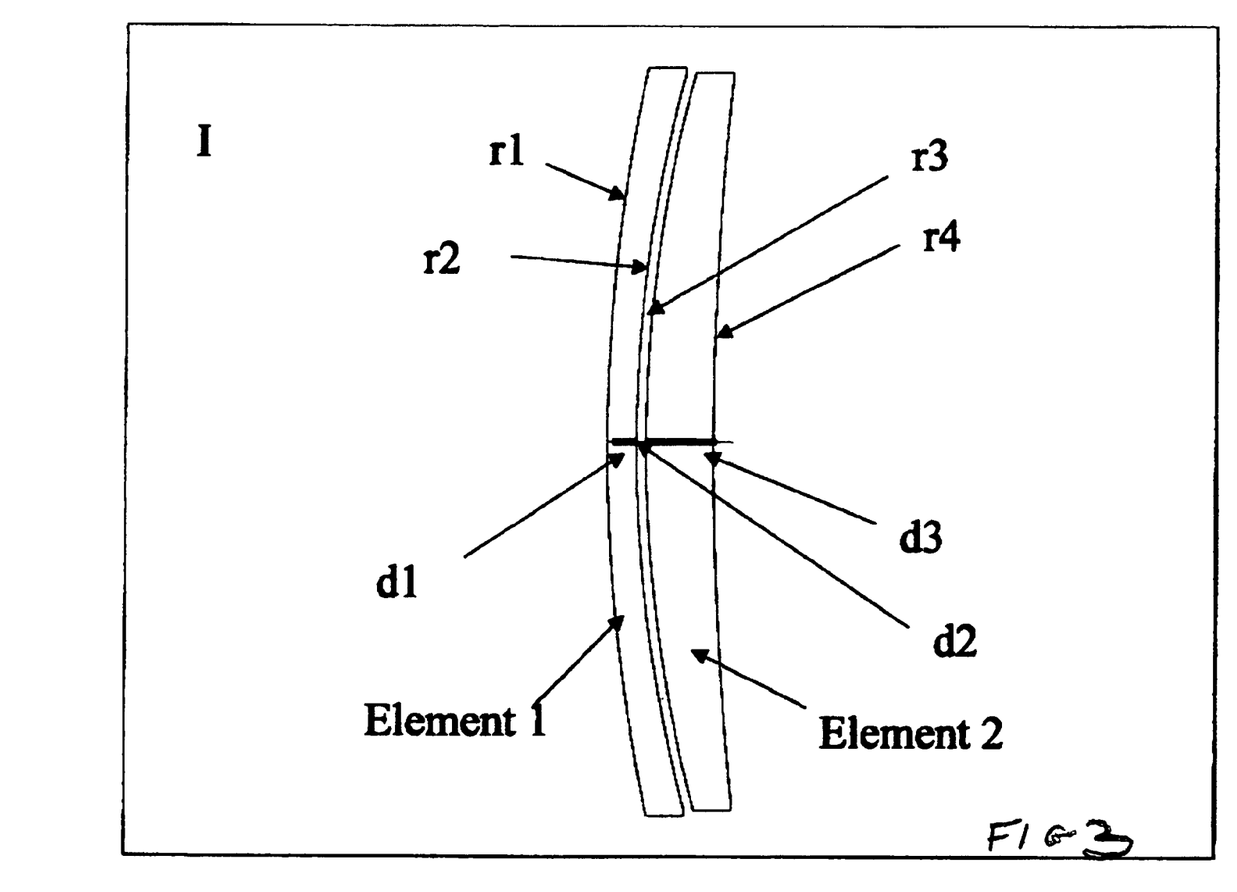
FIG. 3 shows group 1 with their respective lens element radii denoted with the letter "r" and their thickness with the letter "d"; r1 indicated the first radius on element 1; r2 indicates the second radius on element 1; r3 indicates the first radius on element 2; r4 indicates the second radius on element 2; d1 indicates the thickness of element 1; d2 indicates the air space between the two elements and d3 indicates the thickness of element 2.
Figure 4:
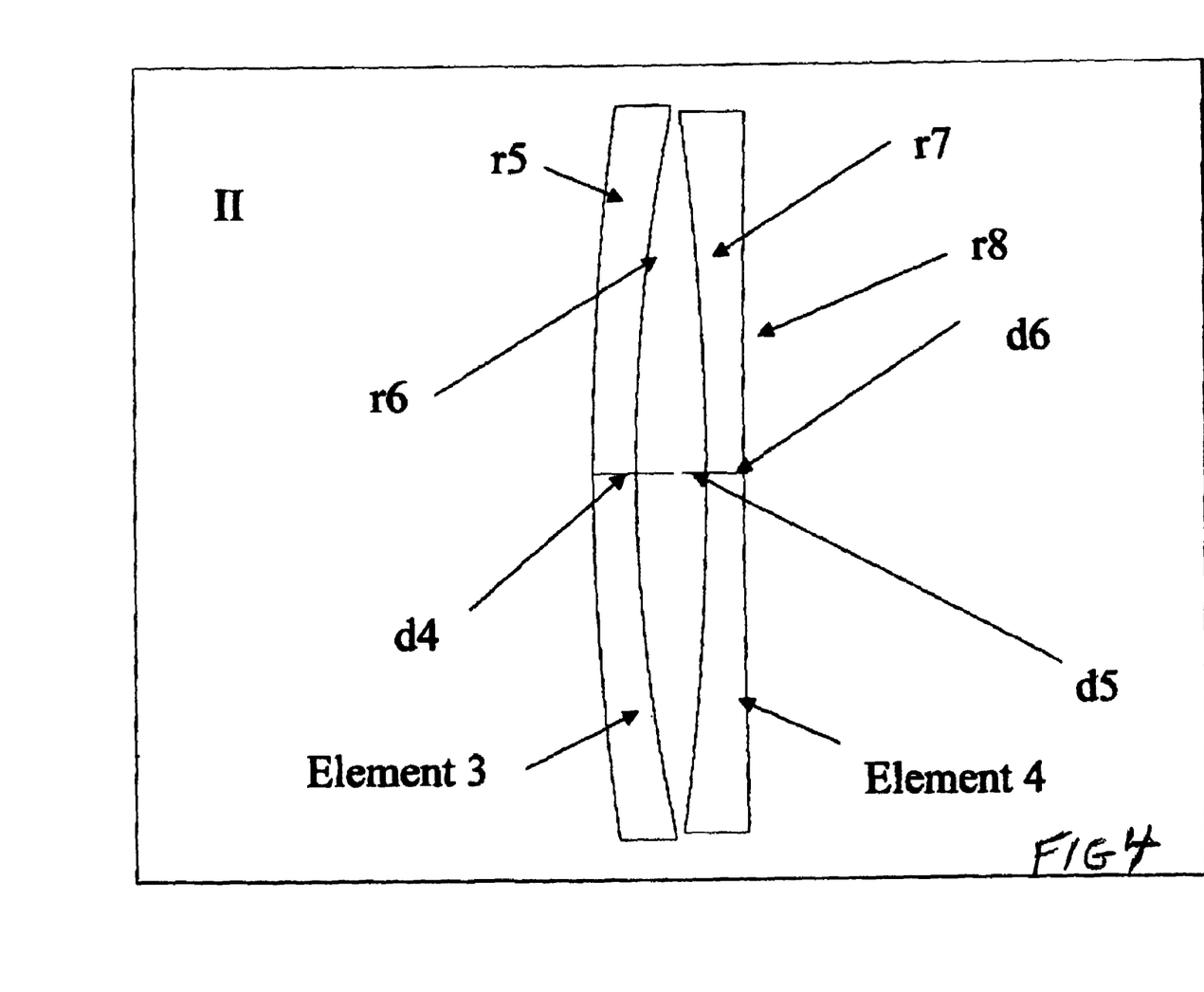
FIG. 4 shows group II with their respective lens element radii denoted with the letter "r" and their thickness denoted with the letter "d".
Figure 5:
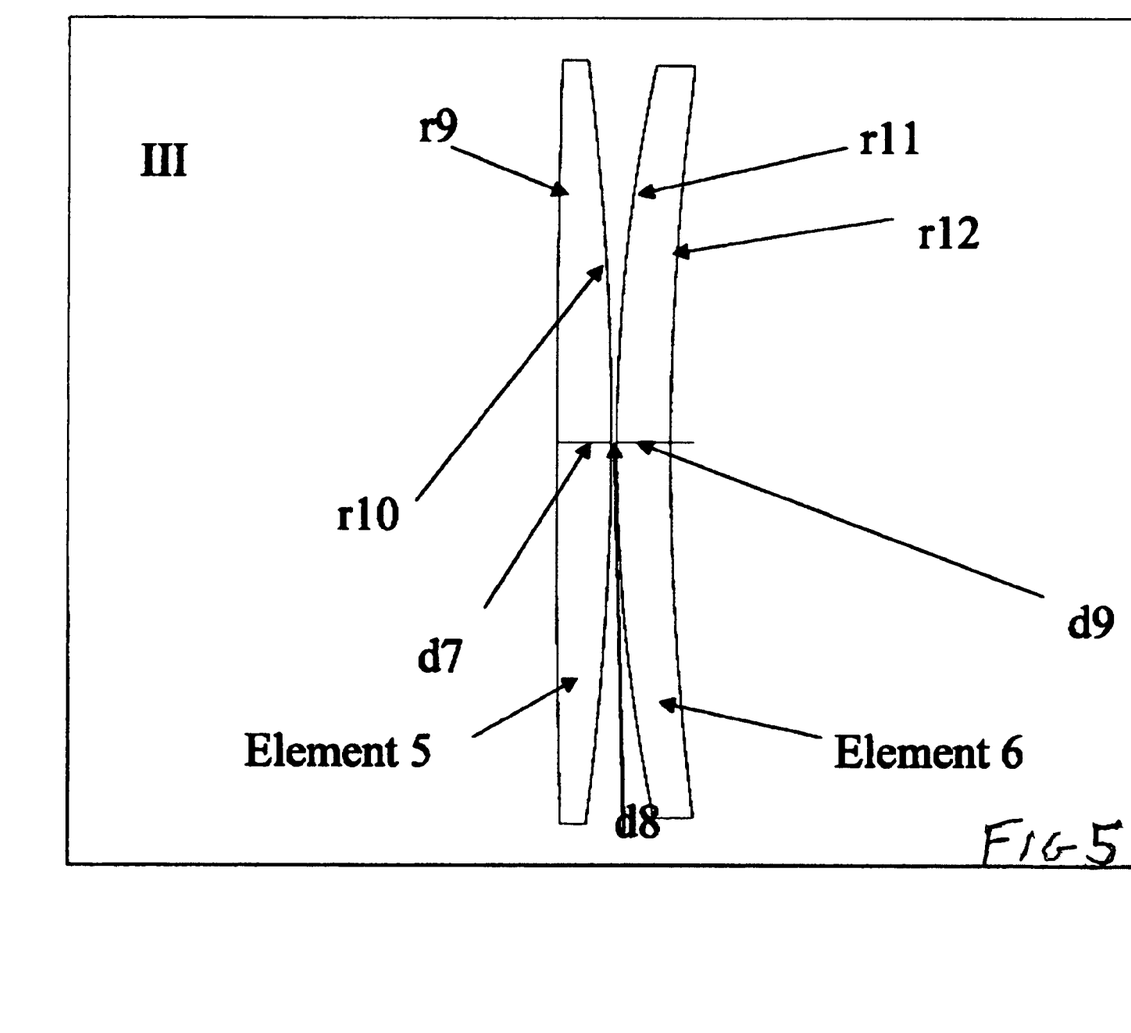
FIG. 5 shows group III with their respective lens element radii denoted with the letter "r" and their thickness denoted with the letter "d".
Figure 6:
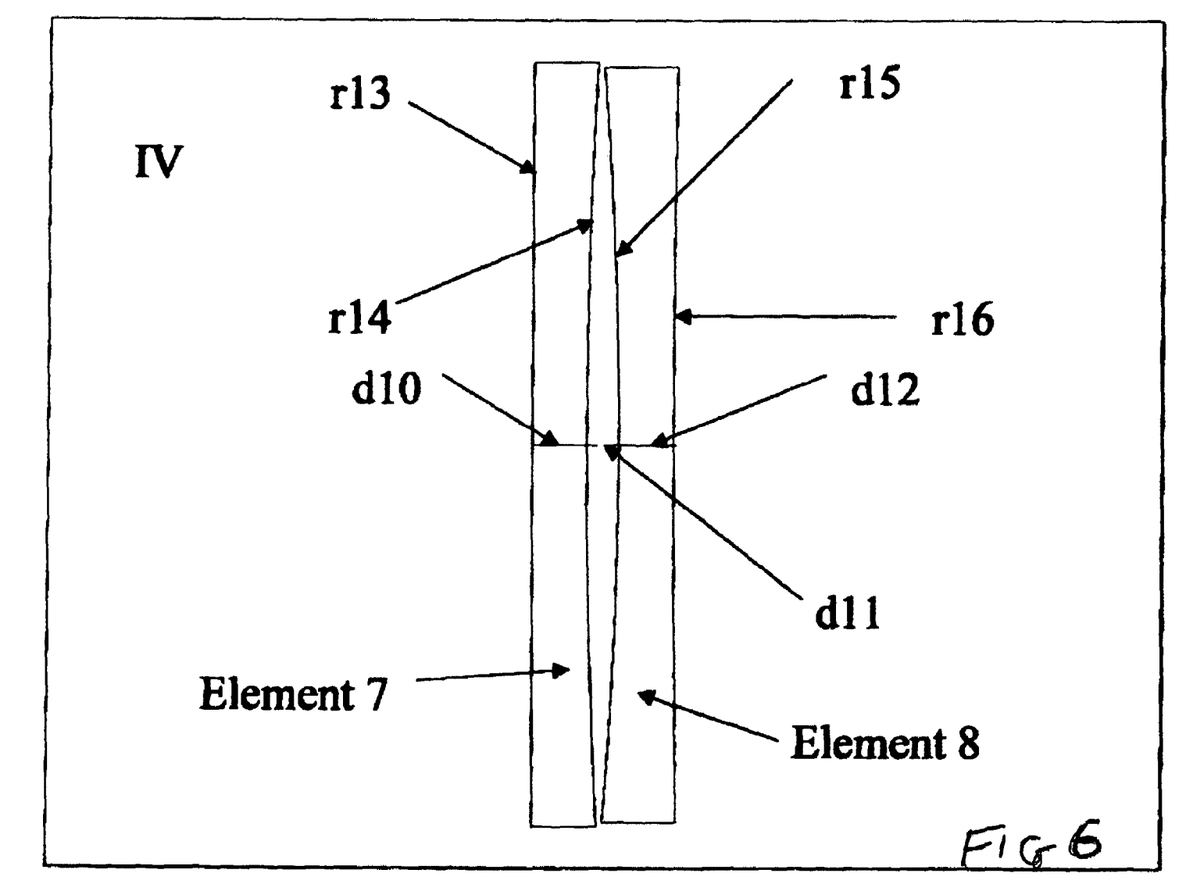
FIG. 6 shows group IV with their respective lens element radii denoted with the letter "r" and their thickness denoted with the letter "d".
Figure 7:
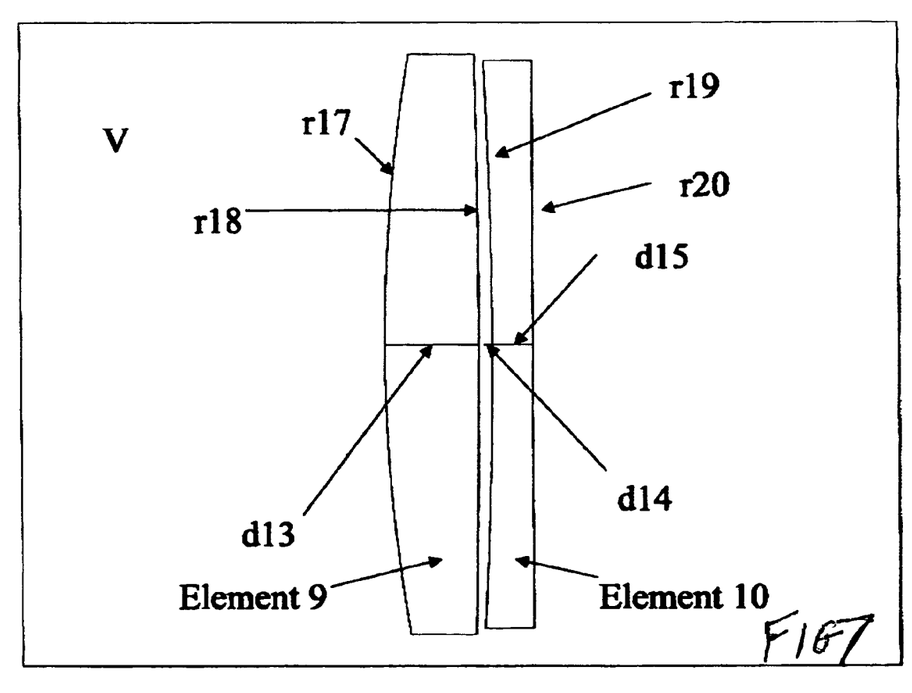
FIG. 7 shows group V with their respective lens element radii denoted with the letter "r" and their thickness denoted with the letter "d".
Figure 8:
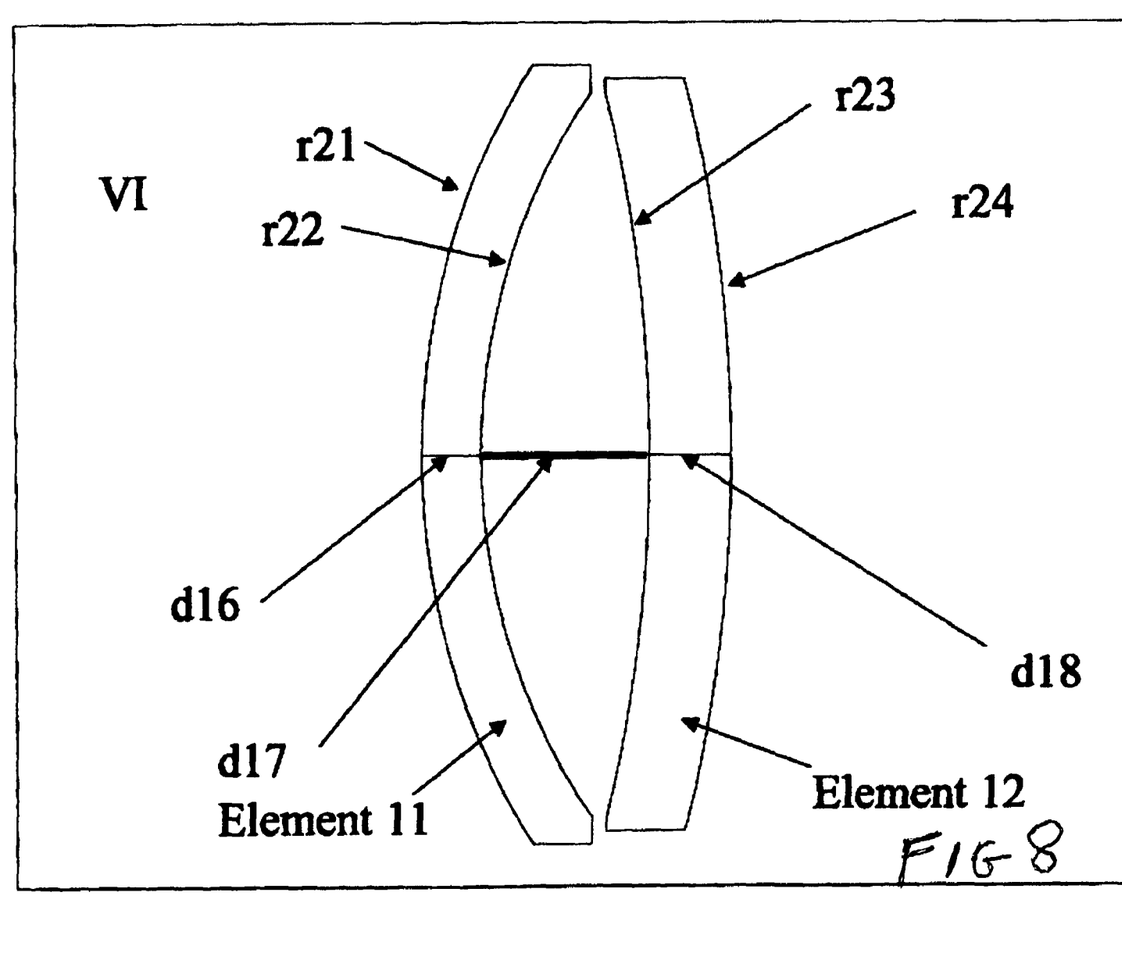
FIG. 8 shows group VI with their respective lens element radii denoted with the letter "r" and their thickness denoted with the letter "d".

Group I, shown in FIG. 3 has two elements, the leftmost element being of germanium with radius r1 to the left, r2 to the right and center thickness, of the two-part lens element d1. This notation carries throughout the remaining figures. Lens element #2 has radius of curvature r3, and r4 with thickness d3. The spacing between the elements has been denoted as d2.

As indicated by the Table, the second element, as with most of the lenses, is made from silicon, whereas lens element 1 of group I and lens element 10 of group V is made from germanium.

Groups II through Group VI are shown similarly in FIGS. 3–7. All thicknesses are denoted as "dXX" (where XX denotes a number) and all radii are denoted sequentially as "rYY" (where YY denotes a number).

The actual prescription of the preferred embodiment is shown in the Table. Note that the radii have been converted to 1/Radius=curvature. The reason for this is that while the Radii can get large, the curvature generally is small numbers and hence readily acceptable for the majority of the workers in the art that would be manufacturing such a lens.

TABLE

Prescription of the Preferred Embodiment

| # | Comment | Curvature | Thickness | Material | Semi-Diameter |
|---|---|---|---|---|---|
| 0 |  | 0.0000 | Infinity |  | 0.0000 |
| 1 | Group 1, Lens #1 | 0.2276 | 0.0752 | Germanium | 0.9500 |
| 2 |  | 0.2840 | 0.0254 |  | 0.9331 |
| 3 | Group 1, Lens #2 | 0.2820 | 0.1728 | Silicon | 0.9365 |
| 4 |  | 0.1149 | 0.2280 |  | 0.9216 |
| 5 | Group 2, Lens #3 | 0.2220 | 0.0752 | Silicon | 0.6289 |
| 6 |  | 0.3412 | 0.1222 |  | 0.6119 |
| 7 | Group 2, Lens #4 | −0.2163 | 0.0658 | Silicon | 0.6104 |
| 8 |  | 0.0323 | 0.9526 |  | 0.6181 |
| 9 | Group 3, Lens #5 | 0.0379 | 0.0940 | Silicon | 0.6501 |
| 10 |  | −0.1907 | 0.0094 |  | 0.6530 |
| 11 | Group 3, Lens #6 | 0.3208 | 0.0940 | Silicon | 0.6433 |
| 12 |  | 0.1996 | 0.1566 |  | 0.6318 |
| 13 | Group 4, lens #7 | 0.0143 | 0.0564 | Silicon | 0.3857 |
| 14 |  | 0.1446 | 0.0325 |  | 0.3806 |
| 15 | Group 4, lens #8 | −0.2134 | 0.0564 | Silicon | 0.3798 |
| 16 |  | 0.0484 | 0.9723 |  | 0.3813 |
| 17 | STOP | 0.0000 | 0.0200 |  | 0.4000 |
| 18 | Group 5, Lens #9 | 0.4033 | 0.1300 | Silicon | 0.4153 |
| 19 |  | −0.0540 | 0.0188 |  | 0.4099 |
| 20 | Group 5, Lens #10 | −0.1321 | 0.0564 | Germanium | 0.4066 |
| 21 |  | 0.0100 | 0.3000 |  | 0.4050 |
| 22 | Group 6, Lens #11 | 1.4665 | 0.0588 | Silicon | 0.3718 |
| 23 |  | 1.6578 | 0.1650 |  | 0.3452 |
| 24 | Group 6, Lens #12 | −0.7000 | 0.0800 | Silicon | 3.4541 |
| 25 |  | −0.2251 | 0.7657 |  |  |

The preferred embodiment of the zoom lens has a focal length that can vary from 50 mm to 200 mm. The method of moving the zoom ratio is depicted in FIG. 2. As shown in the figure, the negative groups II and negative group IV are physically mounted together as schematically indicated by link member Lk. The two groups can be moved in the actual lens assembly as a unit via a brass pin (drive means) that protrudes out of the barrel assembly in one embodiment. The result is that as the pin is moved, groups II and groups IV (negative groups) move together, without relative motion therebetween, relative to the stationary positive groups I and III. In FIG. 2 in particular, observe how we move from a wide angle position (see P1) where group II is as far left as possible to telephoto position where group II is as far to the right as possible (see P4 in the same figure). P2 and P3 are intermediate positions. Drive means 21 such as a stepping motor or the like can be employed to move mechanically linked lens groups II and IV together.

In the design process for a particular application, the required information generally is:

(a) The range of focal length variation;

(b) The minimum or maximum focal length;

(c) The travel of a unit varying the focal length;

(d) The diameter of the entrance pupil at either end of the zoom range;

(e) The diagonal of the image field.

As skilled workers in the art understand, these generic items are generally specified for any form of zoom system. In the case of a mechanically compensated zoom system, two independently moving units are required to achieve the optical performance. In the case of an optically compensated system used in the present invention only the movement of one unit is required. The aforesaid Neil patent utilizes two moving subassemblies and is not optically compensated as he also moves the front lens element to maintain the system in focus, in contrast with applicant's zoom lens. Also, Neil must have at least one aspheric lens to make the lens focus at all.

An important fact is that, with the system described above, the position of the zooming unit in order to vary the focal length of the system is specified by a quadratic (fourth order) equation. There are four positions of the zoom unit where the back focus of the system is unchanged. Between these points there is a shift in the position of the back focus. The goal of the design process is to establish the zoom parameters so that the focus error for all three maximum error points located between four points of exact focus, is a minimum.

In order to set up this situation, components I and V and VI play relatively minor roles. The more important participants are components II, III and IV. For this reason the performance of the total system is adequately specified, for a given zoom range and the travel of the zoom unit, by giving the data for the group made up of components II, III and IV.

For example take the case of a satisfactory design that has been established for a particular zoom range R1 and a zoom travel D1, with minimum focal length F1 min and F1 max, so that F1 max/F1 min=R1. The focal length of the front focusing component 1 is F1. If the front component is replaced by one in which the focal length is F2, then with the other components unchanged, the zoom range is also unchanged but the minimum and maximum focal lengths are F2 min and F2 max where $F2\ min=F1\ min\times F2/F1$, and $F2\ max=F1\ max\times F2/F1$ The only requirement is that the focal points of F1 and F2 occupy the same space. The same treatment may be given to component No. V Since variations and modifications of the specification described will occur to those skilled in the art, the scope of the invention is to be limited solely by the terms of the claims and equivalents thereto.

Ratio Table Section A: group II is comprised of two single negative elements made of silicon wherein the ratios of the surface curvatures are respectively 1.00, 1.537, 0.975, 0.145;

Section B: group III comprises two single positive elements made of silicon, and wherein the ratios of the surface curvatures are respectively 1.00, 5.031, 8.464, 5.266;

This Ratio Table is derived from the aforesaid Prescription Table of the preferred embodiment as follows:

Section A references Group II. The curvatures of section A are respectively given by surfaces 5, 6, 7 and 8 of the Prescription Table.

Taking the curvatures in order:

Ratio 1=Curvature Surface 5 divided by Curvature Surface 5=0.2220/0.2220=1.000

Ratio 2=Curvature Surface 6 divided by Curvature Surface 5=0.3412/0.2220=1.537

Ratio 3=Curvature Surface 7 divided by Curvature Surface 5=0.2163/0.2220=0.975

Ratio 4=Curvature Surface 8 divided by Curvature Surface 5=0.0323/0.2220=0.145

Section B references Group III. The curvatures are respectively given by surfaces 9, 10, 11 and 12 of the Prescription Table.

Taking the curvatures in order:

Ratio 1=Curvature Surface 9 divided by Curvature Surface 9=0.0379/0.379=1.000

Ratio 2=Curvature Surface 10 divided by Curvature Surface 9=0.1907/0.0379=5.031

Ratio 3=Curvature Surface 11 divided by Curvature Surface 9=0.3208/0.0379=8.464

Ratio 4=Curvature Surface 12 divided by Curvature Surface 9=0.1996/0.0379=5.266

Section C references Group IV. The curvatures are respectively given by surfaces 13, 14, 15 and 16 of the Prescription Table.

Taking the curvatures in order:

Ratio 1=Curvature Surface 13 divided by Curvature Surface 13=0.0143/0.0143=1.000

Ratio 2=Curvature Surface 14 divided by Curvature Surface 13=0.1446/0.0143=10.112

Ratio 3=Curvature Surface 15 divided by Curvature Surface 13=0.2134/0.0143=14.923

Ratio 4=Curvature Surface 16 divided by Curvature Surface 13=0.0484/0.0143=3.385

In a prototype of a preferred embodiment of the invention, the input lens of element 1 of lens group I had a diameter of 68.58 mm, with a distance from the extreme left hand surface of element 1 of FIG. 3 to the focal plane B in FIG. 2 being 150 mm. The total span of travel of movable groups II and IV was 22.85 mm.

For example, while each lens group has been described as having two lens elements, the skilled worker in the art of lens design will understand that one or more of the lens groups could consist of only one lens element. For example the skilled worker understands that the front group could be replaced with a single element depending upon the overall requirements of the system.

What is claimed is:

1. An infrared zoom lens assembly comprising:
   (a) six lens groups (I–VI), each lens group having two or fewer lens elements, each of said lens elements having solely spherical surfaces; and wherein
   (b) lens groups (II) and lens groups (IV) are negative power lens groups axially movable in fixedly spaced relation to each other during zooming with respect to lens groups (I) and (III) which are positive power groups and are stationary; and
   (c) wherein groups (V) and (VI) are relay lenses which remain stationary during zooming to relay images passing through lens groups (I–IV) to a focal plane without requiring any additional focusing.

2. The infrared zoom lens of claim 1 wherein lens groups (II) and (IV) can be moved together by a drive means between a wide angle position and a telephoto position.

3. The infra-red zoom lens of claim 2 having the lens prescriptions as follows:

| # | | Curvature | Thickness | Material | Semi-Diameter |
|---|---|---|---|---|---|
| 0 | | 0.0000 | Infinity | | 0.0000 |
| 1 | Group 1, Lens #1 | 0.2276 | 0.0752 | Germanium | 0.9500 |
| 2 | | 0.2840 | 0.0254 | | 0.9331 |
| 3 | Group 1, Lens #2 | 0.2820 | 0.1728 | Silicon | 0.9365 |
| 4 | | 0.1149 | 0.2280 | | 0.9216 |
| 5 | Group 2, Lens #3 | 0.2220 | 0.0752 | Silicon | 0.6289 |
| 6 | | 0.3412 | 0.1222 | | 0.6119 |
| 7 | Group 2, Lens #4 | −0.2163 | 0.0658 | Silicon | 0.6104 |
| 8 | | 0.0323 | 0.9526 | | 0.6181 |
| 9 | Group 3, Lens #5 | 0.0379 | 0.0940 | Silicon | 0.6501 |
| 10 | | −0.1907 | 0.0094 | | 0.6530 |
| 11 | Group 3, Lens #6 | 0.3208 | 0.0940 | Silicon | 0.6433 |
| 12 | | 0.1996 | 0.1566 | | 0.6318 |
| 13 | Group 4, lens #7 | 0.0143 | 0.0564 | Silicon | 0.3857 |
| 14 | | 0.1446 | 0.0325 | | 0.3806 |
| 15 | Group 4, lens #8 | −0.2134 | 0.0564 | Silicon | 0.3798 |
| 16 | | 0.0484 | 0.9723 | | 0.3813 |
| 17 | STOP | 0.0000 | 0.0200 | | 0.4000 |
| 18 | Group 5, Lens #9 | 0.4033 | 0.1300 | Silicon | 0.4153 |
| 19 | | −0.0540 | 0.0188 | | 0.4099 |
| 20 | Group 5, Lens #10 | −0.1321 | 0.0564 | Germanium | 0.4066 |
| 21 | | 0.0100 | 0.3000 | | 0.4050 |
| 22 | Group 6, Lens #11 | 1.4665 | 0.0588 | Silicon | 0.3718 |
| 23 | | 1.6578 | 0.1650 | | 0.3452 |
| 24 | Group 6, Lens #12 | −0.7000 | 0.0800 | Silicon | 3.4541 |
| 25 | | −0.2251 | 0.7657 | | |

4. The infra-red zoom lens of claim 2 having lens prescriptions as follows:
   Section A: group II is comprised of two single negative elements made of silicon wherein the ratios of the surface curvatures are respectively 1.00, 1.537, 0.975, 0.145;
   Section B: group III comprises two single positive elements made of silicon, and wherein the ratios of the surface curvatures are respectively 1.00, 5.031, 8.464, 5.266;
   Section C: group IV comprises two single negative elements made of silicon, and wherein the ratios of the source curvatures are respectively 1.00, 10.112, 14.923, and 3.385.

5. The infra-red zoom lens of claim 1 having the lens prescriptions as follows:

| # | | Curvature | Thickness | Material | Semi-Diameter |
|---|---|---|---|---|---|
| 0 | | 0.0000 | Infinity | | 0.0000 |
| 1 | Group 1, Lens #1 | 0.2276 | 0.0752 | Germanium | 0.9500 |
| 2 | | 0.2840 | 0.0254 | | 0.9331 |
| 3 | Group 1, Lens #2 | 0.2820 | 0.1728 | Silicon | 0.9365 |
| 4 | | 0.1149 | 0.2280 | | 0.9216 |
| 5 | Group 2, Lens #3 | 0.2220 | 0.0752 | Silicon | 0.6289 |
| 6 | | 0.3412 | 0.1222 | | 0.6119 |
| 7 | Group 2, Lens #4 | −0.2163 | 0.0658 | Silicon | 0.6104 |
| 8 | | 0.0323 | 0.9526 | | 0.6181 |
| 9 | Group 3, Lens #5 | 0.0379 | 0.0940 | Silicon | 0.6501 |
| 10 | | −0.1907 | 0.0094 | | 0.6530 |
| 11 | Group 3, Lens #6 | 0.3208 | 0.0940 | Silicon | 0.6433 |
| 12 | | 0.1996 | 0.1566 | | 0.6318 |
| 13 | Group 4, lens #7 | 0.0143 | 0.0564 | Silicon | 0.3857 |
| 14 | | 0.1446 | 0.0325 | | 0.3806 |
| 15 | Group 4, lens #8 | −0.2134 | 0.0564 | Silicon | 0.3798 |
| 16 | | 0.0484 | 0.9723 | | 0.3813 |
| 17 | STOP | 0.0000 | 0.0200 | | 0.4000 |
| 18 | Group 5, Lens #9 | 0.4033 | 0.1300 | Silicon | 0.4153 |
| 19 | | −0.0540 | 0.0188 | | 0.4099 |
| 20 | Group 5, Lens #10 | −0.1321 | 0.0564 | Germanium | 0.4066 |
| 21 | | 0.0100 | 0.3000 | | 0.4050 |
| 22 | Group 6, Lens #11 | 1.4665 | 0.0588 | Silicon | 0.3718 |
| 23 | | 1.6578 | 0.1650 | | 0.3452 |
| 24 | Group 6, Lens #12 | −0.7000 | 0.0800 | Silicon | 3.4541 |
| 25 | | −0.2251 | 0.7657 | | |

6. The infra-red zoom lens of claim 1 having lens prescriptions as follows;
   Section A: group II is comprised of two single negative elements made of silicon wherein the ratios of the surface curvatures are respectively 1.00, 1.537, 0.975, 0.145;
   Section B: group III comprises two single positive elements made of silicon, and wherein the ratios of the surface curvatures are respectively 1.00, 5.031, 8.464, 5.266;
   Section C: group IV comprises two single negative elements made of silicon, and wherein the ratios of the surface curvatures are respectively 1.00, 10.112, 14.923, and 3.385.

7. The infrared zoom lens as defined in claim 1 with a 4:1 ratio of focal lengths.

8. The infrared zoom lens as defined in claim 1 with a range of focal lengths of 50 mm to 200 mm.

9. An infrared zoom lens assembly comprising:
   (a) six lens groups (I–VI), each lens group having two or fewer lens elements, each of said lens elements of groups (I–VI) having solely spherical surfaces; and
   (b) wherein lens groups (II) and lens groups (IV) are negative power lens groups, axially movable in fixedly spaced relation to each other during zooming with respect to lens groups (I and III) which are positive power groups and are stationary; and wherein groups (V and VI) are relay lenses to relay images passing through lens groups (I–IV) to a focal plane and;
   (c) wherein lens groups (II, III, IV and VI) comprise lens elements of silicon and lens group (I) comprises a doublet of germanium and silicon and lens group (V) comprises a doublet of germanium and silicon, for effecting overall correction of axial and lateral chromatic aberrations.

10. The infrared zoom lens of claim 9 wherein lens groups (II) and (IV) are moved together by a drive means between a wide-angle position and a telephoto position without the need for any additional focusing during zooming.

11. The infra-red zoom lens of claim 10 having the following lens prescriptions:

| # | | Curvature | Thickness | Material | Semi-Diameter |
|---|---|---|---|---|---|
| 0 | | 0.0000 | Infinity | | 0.0000 |
| 1 | Group 1, Lens #1 | 0.2276 | 0.0752 | Germanium | 0.9500 |
| 2 | | 0.2840 | 0.0254 | | 0.9331 |
| 3 | Group 1, Lens #2 | 0.2820 | 0.1728 | Silicon | 0.9365 |
| 4 | | 0.1149 | 0.2280 | | 0.9216 |
| 5 | Group 2, Lens #3 | 0.2220 | 0.0752 | Silicon | 0.6289 |
| 6 | | 0.3412 | 0.1222 | | 0.6119 |
| 7 | Group 2, Lens #4 | −0.2163 | 0.0658 | Silicon | 0.6104 |
| 8 | | 0.0323 | 0.9526 | | 0.6181 |
| 9 | Group 3, Lens #5 | 0.0379 | 0.0940 | Silicon | 0.6501 |
| 10 | | −0.1907 | 0.0094 | | 0.6530 |
| 11 | Group 3, Lens #6 | 0.3208 | 0.0940 | Silicon | 0.6433 |
| 12 | | 0.1996 | 0.1566 | | 0.6318 |
| 13 | Group 4, lens #7 | 0.0143 | 0.0564 | Silicon | 0.3857 |
| 14 | | 0.1446 | 0.0325 | | 0.3806 |
| 15 | Group 4, lens #8 | −0.2134 | 0.0564 | Silicon | 0.3798 |
| 16 | | 0.0484 | 0.9723 | | 0.3813 |
| 17 | STOP | 0.0000 | 0.0200 | | 0.4000 |
| 18 | Group 5, Lens #9 | 0.4033 | 0.1300 | Silicon | 0.4153 |
| 19 | | −0.0540 | 0.0188 | | 0.4099 |
| 20 | Group 5, Lens #10 | −0.1321 | 0.0564 | Germanium | 0.4066 |
| 21 | | 0.0100 | 0.3000 | | 0.4050 |
| 22 | Group 6, Lens #11 | 1.4665 | 0.0588 | Silicon | 0.3718 |
| 23 | | 1.6578 | 0.1650 | | 0.3452 |
| 24 | Group 6, Lens #12 | −0.7000 | 0.0800 | Silicon | 3.4541 |
| 25 | | −0.2251 | 0.7657 | | |

12. The infra-red zoom lens of claim 9 having the following lens prescriptions:

| # | | Curvature | Thickness | Material | Semi-Diameter |
|---|---|---|---|---|---|
| 0 | | 0.0000 | Infinity | | 0.0000 |
| 1 | Group 1, Lens #1 | 0.2276 | 0.0752 | Germanium | 0.9500 |
| 2 | | 0.2840 | 0.0254 | | 0.9331 |
| 3 | Group 1, Lens #2 | 0.2820 | 0.1728 | Silicon | 0.9365 |
| 4 | | 0.1149 | 0.2280 | | 0.9216 |
| 5 | Group 2, Lens #3 | 0.2220 | 0.0752 | Silicon | 0.6289 |
| 6 | | 0.3412 | 0.1222 | | 0.6119 |
| 7 | Group 2, Lens #4 | −0.2163 | 0.0658 | Silicon | 0.6104 |
| 8 | | 0.0323 | 0.9526 | | 0.6181 |
| 9 | Group 3, Lens #5 | 0.0379 | 0.0940 | Silicon | 0.6501 |
| 10 | | −0.1907 | 0.0094 | | 0.6530 |
| 11 | Group 3, Lens #6 | 0.3208 | 0.0940 | Silicon | 0.6433 |
| 12 | | 0.1996 | 0.1566 | | 0.6318 |
| 13 | Group 4, lens #7 | 0.0143 | 0.0564 | Silicon | 0.3857 |
| 14 | | 0.1446 | 0.0325 | | 0.3806 |
| 15 | Group 4, lens #8 | −0.2134 | 0.0564 | Silicon | 0.3798 |
| 16 | | 0.0484 | 0.9723 | | 0.3813 |
| 17 | STOP | 0.0000 | 0.0200 | | 0.4000 |
| 18 | Group 5, Lens #9 | 0.4033 | 0.1300 | Silicon | 0.4153 |
| 19 | | −0.0540 | 0.0188 | | 0.4099 |
| 20 | Group 5, Lens #10 | −0.1321 | 0.0564 | Germanium | 0.4066 |
| 21 | | 0.0100 | 0.3000 | | 0.4050 |
| 22 | Group 6, Lens #11 | 1.4665 | 0.0588 | Silicon | 0.3718 |
| 23 | | 1.6578 | 0.1650 | | 0.3452 |
| 24 | Group 6, Lens #12 | −0.7000 | 0.0800 | Silicon | 3.4541 |
| 25 | | −0.2251 | 0.7657 | | |

13. The infrared zoom lens as set forth in claim 9 wherein:
group (II) is comprised of two single negative elements made of silicon wherein the ratios of the surface curvatures of Group II lenses are respectively 1.00, 1.537, 0.975, 0.145;
group (III) comprises two single positive elements made of silicon, and wherein the ratios of the surface curvatures are respectively 1.00, 5.031, 8.464, 5.266; and
group (IV) comprises two single negative elements made of silicon, and wherein the ratios of the surface curvatures are respectively 1.00, 10.112, 14.923, and 3.385.

14. The infrared zoom lens of claim 13 having the following lens prescriptions:

| # | | Curvature | Thickness | Material | Semi-Diameter |
|---|---|---|---|---|---|
| 0 | | 0.0000 | Infinity | | 0.0000 |
| 1 | Group 1, Lens #1 | 0.2276 | 0.0752 | Germanium | 0.9500 |
| 2 | | 0.2840 | 0.0254 | | 0.9331 |
| 3 | Group 1, Lens #2 | 0.2820 | 0.1728 | Silicon | 0.9365 |
| 4 | | 0.1149 | 0.2280 | | 0.9216 |
| 5 | Group 2, Lens #3 | 0.2220 | 0.0752 | Silicon | 0.6289 |
| 6 | | 0.3412 | 0.1222 | | 0.6119 |
| 7 | Group 2, Lens #4 | −0.2163 | 0.0658 | Silicon | 0.6104 |
| 8 | | 0.0323 | 0.9526 | | 0.6181 |
| 9 | Group 3, Lens #5 | 0.0379 | 0.0940 | Silicon | 0.6501 |
| 10 | | −0.1907 | 0.0094 | | 0.6530 |
| 11 | Group 3, Lens #6 | 0.3208 | 0.0940 | Silicon | 0.6433 |
| 12 | | 0.1996 | 0.1566 | | 0.6318 |
| 13 | Group 4, lens #7 | 0.0143 | 0.0564 | Silicon | 0.3857 |
| 14 | | 0.1446 | 0.0325 | | 0.3806 |
| 15 | Group 4, lens #8 | −0.2134 | 0.0564 | Silicon | 0.3798 |
| 16 | | 0.0484 | 0.9723 | | 0.3813 |
| 17 | STOP | 0.0000 | 0.0200 | | 0.4000 |
| 18 | Group 5, Lens #9 | 0.4033 | 0.1300 | Silicon | 0.4153 |
| 19 | | −0.0540 | 0.0188 | | 0.4099 |
| 20 | Group 5, Lens #10 | −0.1321 | 0.0564 | Germanium | 0.4066 |
| 21 | | 0.0100 | 0.3000 | | 0.4050 |
| 22 | Group 6, Lens #11 | 1.4665 | 0.0588 | Silicon | 0.3718 |
| 23 | | 1.6578 | 0.1650 | | 0.3452 |
| 24 | Group 6, Lens #12 | −0.7000 | 0.0800 | Silicon | 3.4541 |
| 25 | | −0.2251 | 0.7657 | | |

15. An infrared zoom lens assembly comprising:
(a) four lens groups (I–IV) each lens group having two or fewer lens elements, each of said lens elements having solely spherical E; and wherein
(b) lens group (II) and lens group (IV) are negative power lens groups, axially movable in fixedly spaced relation to each other during zooming with respect to lens groups (I) and (III) which are positive power groups and are stationary; and including
(c) non-movable relay lens means for relaying an image processed by lens groups (I, II, III, IV) to a focal plane without requiring any additional focusing during zooming.

16. The infrared zoom lens as defined in claim 15 consisting of twelve lenses wherein:

a. group (II) is comprised of two single negative elements made of silicon wherein the ratios of the curvatures are respectively 1.00, 1.537, 0.9745, 0.1378;
b. group III comprises two single positive elements made of silicon, and wherein the ratios of the surface curvatures are respectively 1.00, 5.0287, 8.4607, 5.2637;
c. group IV comprises two single negative elements made of silicon, and wherein the ratios of the surface curvatures are respectively 1.00, 10.11, 14.92, and 3.38; and wherein
d. group I is a doublet using silicon and germanium and group V is a doublet using silicon and germanium in order to correct axial and lateral chromatic aberrations.

17. The infrared zoom lens as defined in claim 16 having a range of focal lengths of 50 to 200 mm.

18. The infra-red zoom lens of claim 15 having the following lens prescriptions;

| # | | Curvature | Thickness | Material | Semi-Diameter |
|---|---|---|---|---|---|
| 0 | | 0.0000 | Infinity | | 0.0000 |
| 1 | Group 1, Lens #1 | 0.2276 | 0.0752 | Germanium | 0.9500 |
| 2 | | 0.2840 | 0.0254 | | 0.9331 |
| 3 | Group 1, Lens #2 | 0.2820 | 0.1728 | Silicon | 0.9365 |
| 4 | | 0.1149 | 0.2280 | | 0.9216 |
| 5 | Group 2, Lens #3 | 0.2220 | 0.0752 | Silicon | 0.6289 |
| 6 | | 0.3412 | 0.1222 | | 0.6119 |
| 7 | Group 2, Lens #4 | −0.2163 | 0.0658 | Silicon | 0.6104 |
| 8 | | 0.0323 | 0.9526 | | 0.6181 |
| 9 | Group 3, Lens #5 | 0.0379 | 0.0940 | Silicon | 0.6501 |
| 10 | | −0.1907 | 0.0094 | | 0.6530 |
| 11 | Group 3, Lens #6 | 0.3208 | 0.0940 | Silicon | 0.6433 |
| 12 | | 0.1996 | 0.1566 | | 0.6318 |
| 13 | Group 4, lens #7 | 0.0143 | 0.0564 | Silicon | 0.3857 |
| 14 | | 0.1446 | 0.0325 | | 0.3806 |
| 15 | Group 4, lens #8 | −0.2134 | 0.0564 | Silicon | 0.3798 |
| 16 | | 0.0484 | 0.9723 | | 0.3813 |
| 17 | STOP | 0.0000 | 0.0200 | | 0.4000 |
| 18 | Group 5, Lens #9 | 0.4033 | 0.1300 | Silicon | 0.4153 |
| 19 | | −0.0540 | 0.0188 | | 0.4099 |
| 20 | Group 5, Lens #10 | −0.1321 | 0.0564 | Germanium | 0.4066 |
| 21 | | 0.0100 | 0.3000 | | 0.4050 |
| 22 | Group 6, Lens #11 | 1.4665 | 0.0588 | Silicon | 0.3718 |
| 23 | | 1.6578 | 0.1650 | | 0.3452 |
| 24 | Group 6, Lens #12 | −0.7000 | 0.0800 | Silicon | 3.4541 |
| 25 | | −0.2251 | 0.7657 | | |

19. The infrared zoom lens as defined in claim 18 having a range of focal lengths of 50 to 200 mm.

20. The infrared zoom lens as defined in claim 15 having a range of focal lengths of 50 to 200 mm.

21. The infrared zoom lens as defined in claim 15 with a 4:1 ratio of focal lengths.

* * * * *